United States Patent
Solov et al.

(10) Patent No.: US 7,094,852 B2
(45) Date of Patent: Aug. 22, 2006

(54) WATER SOLUBLE COPOLYMERS PREPARED USING PHOSPHORUS CONTAINING CHAIN TRANSFER AGENTS

(75) Inventors: Natalie A. Solov, Holland, PA (US); William S. Carey, Wallingford, PA (US)

(73) Assignee: General Electric Company, Fairfield, CT (US)

( * ) Notice: Subject to any disclaimer, the term of this patent is extended or adjusted under 35 U.S.C. 154(b) by 142 days.

(21) Appl. No.: 10/646,278

(22) Filed: Aug. 22, 2003

(65) Prior Publication Data

US 2004/0039144 A1 Feb. 26, 2004

Related U.S. Application Data

(63) Continuation-in-part of application No. 09/878,646, filed on Jun. 11, 2001, now Pat. No. 6,641,754, which is a continuation-in-part of application No. 09/808,679, filed on Mar. 15, 2001, now Pat. No. 6,444,747.

(51) Int. Cl.
*C08F 130/02* (2006.01)
*C08F 220/26* (2006.01)

(52) U.S. Cl. .................. 526/274; 526/145; 526/317.1; 526/318.41

(58) Field of Classification Search ................ 526/145, 526/317, 318.41, 274
See application file for complete search history.

(56) References Cited

U.S. PATENT DOCUMENTS

| | | | |
|---|---|---|---|
| 2,957,931 A | 10/1960 | Hamilton et al. |
| 3,875,202 A | 4/1975 | Steckler |
| 4,471,100 A | 9/1984 | Tsubakimoto et al. |
| 4,659,480 A | 4/1987 | Chen et al. |
| 4,659,481 A | 4/1987 | Chen |
| 4,681,686 A | 7/1987 | Richardson et al. |
| 4,701,262 A | 10/1987 | Chen |
| 4,717,499 A | 1/1988 | Chen |
| 4,732,698 A | 3/1988 | Chen |
| 4,759,851 A | 7/1988 | Chen |
| 4,872,995 A | 10/1989 | Chen et al. |
| 4,895,663 A | 1/1990 | Chen |
| 4,913,822 A | 4/1990 | Chen et al. |
| 5,077,361 A | 12/1991 | Hughes et al. |
| 5,180,498 A | 1/1993 | Chen et al. |
| 5,256,746 A | 10/1993 | Blankenship et al. |
| 5,292,379 A | 3/1994 | Reichgott et al. |
| 5,294,686 A | 3/1994 | Fiarman et al. |
| 5,362,324 A | 11/1994 | Cerulli et al. |
| 5,391,238 A | 2/1995 | Reichgott et al. |
| 5,575,920 A | 11/1996 | Freese et al. |
| 5,661,206 A | 8/1997 | Tanaka et al. |
| 5,705,665 A | 1/1998 | Ichinohe et al. |
| 5,726,267 A | 3/1998 | Howland et al. |
| 6,444,747 B1 | 9/2002 | Chen et al. |

FOREIGN PATENT DOCUMENTS

| | | |
|---|---|---|
| EP | 448717 | 11/1995 |
| GB | 2328440 | 2/1999 |
| JP | 2102152 | 4/1990 |
| JP | 2206757 | 8/1990 |

OTHER PUBLICATIONS

*Betz Handbook of Industrial Water Conditioning*, 8th Ed., 1980, Betz Laboratories, Inc., Trevose, PA pp. 85-96.
*Betz Handbook of Industrial Water Conditioning*, 9th Ed., 1991, Betz Laboratories, Inc., Trevose, PA, pp. 96-104.
*Bimax Website Product Sheet*, http://www.bimax.com/ally1-htm, pp. 1-2, copyrights 1998, Bimax Chemicals Ltd., revised Jan. 20, 2002, printed Aug. 6, 2003.

*Primary Examiner*—Tae H. Yoon
(74) *Attorney, Agent, or Firm*—Wegman, Hessler & Vanderburg

(57) ABSTRACT

Processes for making acrylic acid/allyl ether copolymers are provided wherein hypo phosphorous acid and its salts are used as chain transfer agents during the polymerization process. The hypo phosphorous acid feed time is regulated in comparison to the feed time of the acrylic acid feed at a duration of about 0–75% hypo phosphorous acid feed:total acrylic acid feed time. Phosphorus containing copolymers made by the processes are also disclosed.

11 Claims, No Drawings

WATER SOLUBLE COPOLYMERS PREPARED USING PHOSPHORUS CONTAINING CHAIN TRANSFER AGENTS

RELATED APPLICATIONS

The present application is a continuation in part application of Ser. No. 09/878,646 filed Jun. 11, 2001 now U.S. Pat. No. 6,641,754, which, in turn, is a continuation in part of application Ser. No. 09/808,679 filed Mar. 15, 2001, now U.S. Pat. No. 6,444,747 issued Sep. 3, 2002.

FIELD OF THE INVENTION

The present invention relates to a process for the efficient use of hypophosphorous acid or its salts in the preparation copolymers of acrylic acid with allyloxy monomers comprising employing a staggered feed of the hypophosphorous acid relative to the acrylic acid during the polymerization into a reactor containing the allyloxy monomer. The resulting novel acrylic acid copolymers are useful as deposit control and corrosion inhibition agents in water treatment, pulp and paper manufacturing processes, in pretreating of metals; as rheology modifiers for concrete and cement additives; as cleaning agents for membranes; and as hydrophilic modifier components in personal care, cosmetic and pharmaceutical formulations. These novel polymeric compositions comprise water-soluble or water dispersible copolymers of ethylenically unsaturated monomers with hydroxyl, sulfate, phosphate, phosphite or carboxylic terminated polyalkylene oxide allyl ethers.

BACKGROUND OF THE INVENTION

The problems of corrosion and scale formation and the attendant effects have troubled water systems for years. For instance, scale tends to accumulate on internal walls of various water systems, such as boiler and cooling systems, and thereby materially lessen the operational efficiency of the system.

Deposits in lines, heat exchange equipment, etc., may originate from several causes. For example, precipitation of calcium carbonate, calcium sulfate and calcium phosphate in the water system leads to an accumulation of these scale-imparting compounds along or around the metals surfaces that contact the flowing water circulating through the system. In this manner, heat transfer functions of the particular system are severely impeded.

Corrosion, on the other hand, is a degradative electrochemical reaction of a metal with its environment. Simply stated, it is the reversion of refined metals to their natural state. For example, iron ore is iron oxide. Iron ore is refined into steel. When steel corrodes, it forms iron oxide, which, if unattended, may result in failure or destruction of the metal, causing the particular water system to shut down until the necessary repairs can be made.

Typically, in cooling water systems, the formation of calcium sulfate, calcium phosphate and calcium carbonate, among others, has proven deleterious to the overall efficiency of the cooling water system. The recent trend in cooling treatments is utilizing of high levels of orthophosphate to promote passivation of the metal surfaces in contact with the system water. Thus, it has become critically important to control calcium phosphate crystallization so that relatively high levels of orthophosphate may be maintained in the system to achieve the desired passivation without resulting in fouling or impeded heat transfer functions that would normally be caused by calcium phosphate deposition.

Although steam-generating systems are somewhat different from cooling systems, they share a common problem in regard to deposit formation.

As detailed in the Betz Handbook of Industrial Water Conditioning, 8$^{th}$ Edition, 1980, Betz Laboratories Inc., Trevose, Pa, Pages 85–96, the formation of scale and sludge deposits on boiler heating surfaces is a serious problem encountered in steam generation. Although current industrial steam producing systems make use of sophisticated external treatments of the boiler feed water, e.g., coagulation, filtration, softening of water prior to its feed into the boiler system, these operations are only moderately effective. In all cases, external treatment itself does not provide adequate treatment since muds, sludge and hardness-imparting ions escape the treatment, and eventually are introduced into the steam generating system.

In addition to the problems caused by mud, sludge or silt, the industry has also had to contend with boiler scale. Although external treatment is utilized specifically in an attempt to remove calcium and magnesium from the feed water, scale formation due to residual hardness, i.e., calcium and magnesium salts, is always experienced. Accordingly, internal treatment, i.e., treatment of the water fed to the system, is necessary to prevent, reduce and/or retard formation of scale imparting compounds and their resultant deposition. The carbonates of magnesium and calcium are not the only problem compounds as regards to scale, but also waters having high contents of phosphate, sulfate and silicate ions either occurring naturally or added for other purposes cause problems since calcium and magnesium, and any iron or copper present, react and deposit as boiler scale. As is obvious, the deposition of scale on the structural parts of a steam generating system causes poorer circulation and lower heat transfer capacity, resulting in an overall loss in efficiency.

RELATED ART

A number of additives have been proposed for addition to water and aqueous systems to control the formation of mineral deposits and in inhibiting corrosion, among them acrylic acid copolymers with allyloxy based monomers. For example, see U.S. Pat. Nos. 4,659,481 (Chen), 4,872,995 (Chen et al.), and 6,444,747 (Chen et al.). As used hereinafter the term "acrylic acid copolymer" is intended to include copolymers of acrylic acid with one or more ethylenically unsaturated compounds.

The use of hypophosphorous acid as a chain transfer agent in the production of polycarboxylic acid polymers is well known to those skilled in the art. For example, see U.S. Pat. Nos. 2,957,931 (Hamilton et al.) and 4,681,686 (Richardson et al.), and GB Pat. No. 2,328,440 (Wilson et al.). As used hereinafter the term "hypophosphorous acid" is intended to include salts thereof.

U.S. Pat. No. 5,077,361 (Hughes et al.) discloses that it is common to use phosphorous acid as a chain transfer agent in the preparation of polycarboxylic acid polymers because it introduces phosphinate and phosphonate functionality that confers superior performance in some applications. It is also further noted that inefficiency is a common problem associated with known processes utilizing hypophosphorous acid as a chain transfer agent in that a significant portion typically does not incorporate into the polymer matrix. Hughes et al. '361 teaches a process for enhancing the efficiency of hypophosphorous acid as chain transfer agent by requiring in-process neutralization of at least 20% of the acid groups of the carboxylic acid monomers present. U.S. Pat. No. 5,294,686 (Fiarman et al.) further teaches improvements over the method of Hughes et al. '361 by conducting the polymerization such 80–100 percent of the monoethylenically unsaturated acids are metered into a polymerization reactor and that the final polymer solids in the aqueous solution is at least 50% by weight.

U.S. Pat. No. 5,256,746 (Blankenship et al.) teaches a method to maximize the formation of monoalkyl phosphinate and monoalkyl phosphonate species by conducting polymerizations employing hypophosphorous acid as a chain transfer agent in the presence of an effective amount of a monoethylenically unsaturated dicarboxylic acid.

DETAILED DESCRIPTION OF THE INVENTION

The present invention is directed towards a novel process of preparing copolymers of acrylic acid with allyloxy monomers utilizing hypophosphorous acid as a chain transfer agent wherein staggering the reagent feeds enhances chain transfer efficiency and monomer conversion. The objective is an aqueous solution polymerization process for the preparation of water-soluble or water dispersible polymers having the formula depicted in Formula 1

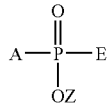

Formula I wherein A is a random polymeric residual comprising at least one unit of Formula II

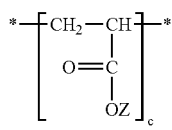

Formula II and at least one unit of Formula III

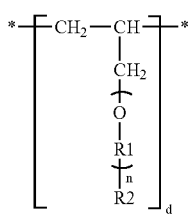

Formula III and E is hydrogen, OZ, a residue A, or mixtures thereof; wherein segment R1 is —CH$_2$—CH$_2$—, —CH$_2$—CH(CH$_3$)—, —CH$_2$—CH(OH)—, —CH$_2$—CH(OH)—CH$_2$—, or mixtures thereof; R2 is OH, SO$_3$Z, OSO$_3$Z, PO$_3$Z$_2$, OPO$_3$Z$_2$, CO$_2$Z, or mixtures thereof; n ranges from 1 to 100; Z is hydrogen or a water soluble cation such as Na, K, Ca or NH$_4$; the molar ratio c:d ranges from 30:1 to 1:20; with the proviso that greater than 75 mole percent of the hypophosphorous acid utilized in the synthesis of said copolymer incorporates into the polymer matrix.

In a preferred embodiment of the invention R1 is —CH$_2$—CH$_2$—, —CH$_2$—CH(OH)—CH$_2$—, or mixtures thereof; R2 is OH, SO$_3$Z, OSO$_3$Z or mixtures thereof; n ranges from 1 to 20; Z is hydrogen or a water soluble cation such as Na, K, or NH$_4$; the molar ratio c:d ranges from 15:1 to 1:10; with the proviso that greater than 75 mole % of the hypophosphorous acid utilized in the synthesis of said copolymer incorporates into the polymer matrix.

In a particularly preferred embodiment of the invention R1 is —CH$_2$—CH$_2$—; R2 is OSO$_3$Z; n ranges from 5 to 20; Z is hydrogen or a water soluble cation such as Na, K, or NH$_4$; the molar ratio c:d ranges from 15:1 to 2:1; with the proviso that greater than 85 mole % of the hypophosphorous acid utilized in the synthesis of said polymer incorporates into the polymer matrix.

For the purpose of this invention the efficiency of the hypophosphorous acid as a chain transfer chain is defined as the molar percentage of the hypophosphorous acid that incorporates into the polymer matrix to yield the compounds as depicted in Formulas IV–VI relative to the total amount of hypophosphorous acid charged

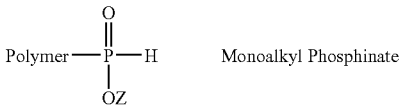

Formula IV  Monoalkyl Phosphinate

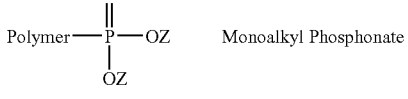

Formula V  Monoalkyl Phosphonate

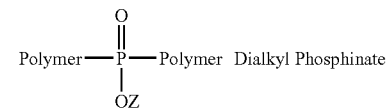

Formula VI  Dialkyl Phosphinate wherein the designation "Polymer" is representative of the monomer repeat units depicted in Formulas II and III and Z is as previously described. For Formula VI it is to be further understood that one of the "Polymer" segments could be comprised exclusively of the monomer repeat unit depicted in Formula II or III provided that the other "Polymer" segment comprises a monomer repeat unit depicted in Formula III or II, respectively.

The process of the present invention utilizes hypophosphorous acid as a chain transfer agent in the aqueous polymerization of acrylic acid with an allyloxy monomer wherein the efficiency of the hypophosphorous acid is at least 75 mole percent. Exemplary allyloxy monomers include, but are not limited to, 1-allyloxy-2,3-propanediol (BiMax APD), sodium 1-allyloxy-2-hydroxypropyl sulfonate (BiMax CS-AHPS), hydroxypolyethoxy(10) allyl ether (BiMax AE-10), and ammonium allylpolyethoxy(10) sulfate (BiMax DVP-010).

The chain transfer agent of the present invention is hypophosphorous acid or one of its salts, preferably sodium hypophosphite. The level of phosphorous acid will vary depending with the desired molecular weight for the acrylic acid copolymer. In general, the hypophosphorous acid charge is from about 0.1 to about 20 mole percent of based on the total monomer charge. A preferred range is from about 1 to about 5 mole percent.

Suitable water-soluble initiators include, but are not limited to, peroxide such as hydrogen peroxide and t-butyl peroxide; persulfate such as sodium and ammonium persulfate; azo such as 2,2'azobis(2-amidinopropane) dihydrochloride and 4,4'-azobis(4-cyanopentanoic acid); and redox such as sodium bisulfite, ascorbic acid and the like in conjunction with a suitable oxidizing agent such as potassium bromate, sodium persulfate and the like. Preferably, persulfate is utilized as the initiator. In general, the initiator charge is form about 0.01 to 10.0 mole percent based on the total monomer charge. A preferred range is from 1 to about 5 mole percent.

Branching agents such as methylenebisacrylamide, polyethyleneglycol diacrylate, and the like may optionally be utilized in the polymerization. The level of branching agent utilized is limited to that which yields water-soluble or water-dispersible acrylic acid copolymers.

The molecular weight of the acrylic acid copolymer of Formula I is not critical but preferably falls within the range Mw of about 1,000 to 1,000,000. More preferably from about 1,000 to 50,000 and most preferably from about 1,500 to 25,000. The essential criteria is that the acrylic acid copolymer be water-soluble or water-dispersible.

The process of the invention requires charging to a reactor, preferably under an inert atmosphere such as nitrogen, water and the allyloxy monomers. The initiator, hypophosphorous acid, and acrylic acid are then charged at reaction temperature with the proviso that the duration of the hypophosphorous feed is 0–75%, preferably about 1–75%, of the acrylic acid feed time. In one aspect of the invention, the hypophosphorous acid may be shot fed to the reactor prior to addition of the acrylic acid containing charge. Most preferably, the duration of the hypophosphorous acid (or salt) feed is from about 50 to about 75% of the acrylic acid feed time. At a hypophosphorous acid feed duration in excess of 75% of the acrylic acid feed time, unacceptable high levels of residual hypophosphorous acid and/or its inorganic oxidized by-products, for example phosphorous acid and phosphoric acid, result that hinder the efficacy of the acrylic acid copolymer.

Typically, the initiator feed is at minimum 100% of the acrylic acid feed duration with the key criteria being that a sufficient concentration of radical species is maintained to initiate substantially all the acrylic acid monomer charged over the duration of the polymerization reaction. One skilled in the art, however, can vary the reaction conditions based on their knowledge of the initiator half life to add the initiator from 0–150%, preferably about 1–150%, of the acrylic acid feed duration and still maintain an adequate radical concentration to consume the acrylic acid over the course of its feed so as to result in significant monomer conversion into polymer such as at least about 90% conversion.

The polymerization is normally conducted from about 60° C. to about 120° C., more preferably from 80° C. to 100° C. The reaction solids, expressed as the weight percent non-volatile solids at the completion of the reaction, normally range from about 25% to about 60%, more preferably from 40% to 50%. The acrylic acid feed typically is normally conducted over a period from about 0.5 hour to about 6 hours, more preferably from 1 to 3 hours. In general, rate of the acrylic acid feed is dictated by the desire to maintain a certain reaction temperature profile which is influenced by factors such as transfer pump sizing, reactor cooling capacity, reaction solids and the like. The initiator and hypophosphorous acid are typically handled as aqueous solutions.

Preferably, the reactants fed to the reactor are added in a linear fashion; however, non-linear feed rates may be utilized provided the conversion of the hypophosphorous acid is not adversely affected. For example, if the hypophosphorous acid feed is 75% of the acrylic acid feed duration it may not be desirable to utilize a non-linear feed for the hypophosphorous acid wherein a significant amount of the charge is added at the end of the feed if the acrylic acid feed is linear.

Acrylic acid allyloxy copolymers are effective in a number of applications known to those skilled in the art. For example, see U.S. Pat. No. 6,444,747 (Chen et al.) col. 4 line 5 to col. 6 line 2 and the background of the invention U.S. Pat. No. 5,726,267 (Howland et al.); both patents of which are hereby incorporated by reference.

The present invention will now be further described with reference to a number of specific examples that are to be regarded solely as illustrative and not restricting the scope of the present invention.

EXAMPLES

Example 1

Poly[acrylic Acid-co-ammonium Allylpolyethoxy (10) Sulfate]

To a suitable reaction flask equipped with a mechanical agitator, a thermometer, a reflux condenser, a nitrogen inlet and addition inlets was charged 73.5 g of deionized water and 58.5 g (0.1 mol) of ammonium allyl polyethoxy(10) sulfate. While sparging with nitrogen, the solution was heated to 85° C. An initiator solution containing 1.9 g sodium persulfate in 5.7 g water was prepared in a separate container and sparged with nitrogen for ten minutes. Likewise, a chain transfer solution containing 1.06 g sodium hypophosphite and 3.18 g water was also prepared in a separate container and sparged with nitrogen for ten minutes. The initiator solution and 21.6 g. (0.3 mol) of acrylic acid were added gradually to the reaction flask over a two-hour period. The sodium hypophosphite solution was simultaneously added over a one-hour period. Upon completion of all the additions, the reactor contents were heated to 95° C. and held for 90 minutes. The reaction was then cooled to lower than 40° C. and 50% caustic solution was added until the pH measured 5–6.

The structure of the resulting copolymer was verified by $^{13}$C NMR as evidenced by the lack of peaks between the region of 100–130 ppm (corresponding to typically >98% conversion). The polymer solution was diluted to 25% solids and had a Brookfield viscosity of 11 cps at 25° C. The hypophosphorous acid efficiency was determined to be 92.6 mole % by $^{31}$p NMR.

Example 2

Poly[acrylic Acid-co-ammonium Allylpolyethoxy (10) Sulfate]

As in Example 1 with the exception of shot feeding the sodium hypophosphite solution prior to beginning the acrylic acid and initiator feeds. The structure of the resulting copolymer was verified by $^{13}$C NMR as evidenced by the lack of peaks between the region of 100–130 ppm. The polymer solution was diluted to 25% solids and had a Brookfield viscosity of 11.9 cps at 25° C. The hypophosphorous acid efficiency was determined to be 96.3 mole % by $^{31}$p NMR.

Example 3

Poly[acrylic Acid-co-sodium 1-allyloxy-2-hydroxy-propane Sulfonate]

As in Example 1 with the exception that an equal molar amount of 1-allyloxy-2-hydroxy-propane sulfonate was substituted for the ammonium allyloxypolyethoxy (10) sulfate. The structure of the resulting copolymer was verified by $^{13}$C NMR as evidenced by the lack of peaks between the region of 100–130 ppm. The hypophosphorous acid efficiency was determined to be 96.7 mole % by $^{31}$P NMR.

Example 4

Poly[acrylic Acid-co-sodium 1-allyloxy-2-hydroxy-propane Sulfonate]

As in Example 2 with the exception that an equal molar amount of 1-allyloxy-2-hydroxy-propane sulfonate was substituted for the ammonium allyloxypolyethoxy (10) sulfate. The structure of the resulting copolymer was verified by $^{13}$C NMR as evidenced by the lack of peaks between the region of 100–130 ppm. The hypophosphorous acid efficiency was determined to be 96.7 mole % by $^{31}$P NMR.

Example 5

Poly[acrylic Acid-co-ammonium Allylpolyethoxy (10) Sulfate]

As in Example 1 with the exception of decreasing the final solids content to approximately 40 wt. % non-volatile solids. The structure of the resulting copolymer was verified by $^{13}$C NMR as evidenced by the lack of peaks between the region of 100–130 ppm. The hypophosphorous acid efficiency was determined to be 83.0 mole % by $^{31}$P NMR.

Example 6

Poly[acrylic Acid-co-ammonium Allylpolyethoxy (10) Sulfate]

As in Example 1 with the exception that the hypophosphorous acid feed was 90 minutes. The structure of the resulting copolymer was verified by $^{13}$C NMR as evidenced by the lack of peaks between the region of 100–130 ppm. The hypophosphorous acid efficiency was determined to be 80.1 mole % by $^{31}$P NMR.

Example 7

Poly[acrylic Acid-co-hydroxypolyethoxy (10) Allyl Ether]

As in Example 6 with the exception that an equal molar amount of hydroxypolyethoxy (10) allyl ether was substituted for the ammonium allyloxypolyethoxy (10) sulfate. The structure of the resulting copolymer was verified by $^{13}$C NMR as evidenced by the lack of peaks between the region of 100–130 ppm. The hypophosphorous acid efficiency was determined to be 92.5 mole % by $^{31}$P NMR.

Comparative Example 1

Poly[acrylic Acid-co-ammonium Allylpolyethoxy (10) Sulfate]

As in Example 1 with the exception that duration of the sodium hypophosphite solution feed was 120 minutes. The structure of the resulting copolymer was verified by $^{13}$C NMR as evidenced by the lack of peaks between the region of 100–130 ppm. The hypophosphorous acid efficiency was determined to be 64.8 mole % by $^{31}$P NMR.

Comparative Example 2

Poly[acrylic Acid-co-ammonium Allylpolyethoxy (10) Sulfate]

As in Example 1 with the exception that the ammonium allyloxypolyethoxy (10) sulfate was charged to the reactor over a two-hour period. The product was analyzed and found to contain approximately 25-mole % residual ammonium allyloxypolyethoxy (10) sulfate based on $^{13}$C NMR analysis relative to an internal standard. The hypophosphorous acid efficiency was determined to be 84.4 mole % by $^{31}$P NMR.

The data in Table 1 below are the final reaction solids, hypophosphorous acid feed duration as a percentage of the acrylic acid feed; indication if residual monomer was present; and the efficiency of the hypophosphorous acid expressed as the mole % incorporated into the polymer matrix. Examples 1–5 prepared according to the process of the present invention at from about 40 to about 60 weight percent solids exhibited a hypophosphorous acid to about 95 mole percent. In addition, the conversion of the monomers was >98% for all of these reactions. Comparative Example 1 demonstrates that extending the hypophosphorous acid feed in excess of that specified by the current invention results in a significant decrease in the hypophosphorous acid efficiency. Comparative Example 2 demonstrates that a significant increase in the residual allyloxy monomer content results if the allyloxy monomer is not charged initially to the reactor. As noted for the Comparative Example 2, if 100% of the monoethylenically unsaturated acid is metered into the reactor, a significant level of residual allyloxy monomer results.

TABLE 1

| Example | Reaction Solids | Hypo Feed | Resd. Monomer | Hypo Effic. |
|---|---|---|---|---|
| 1 | 52.4% | 50 | No | 92.6% |
| 2 | 50.7% | 0 | No | 96.3% |
| 3 | 59.2% | 50 | No | 96.7% |
| 4 | 57.4% | 0 | No | 96.7% |
| 5 | 39.9% | 50 | No | 83.0% |
| 6 | 50.8% | 75 | No | 80.1% |
| 7 | 50.3% | 75 | No | 92.5% |
| Comparative 1 | 50.4% | 100 | No | 64.8% |
| Comparative 2 | 50.5% | 50 | Yes | 84.4% |

Example 8

Phosphate Scale Inhibition—Dynamic Heat Transfer Simulations

Two samples of poly[acrylic acid-co-ammonium allylpolyethoxy (10) sulfate], 3:1 mole ratio respectively, of approximately 14,000 Mw each were screened for activity under dynamic heat transfer conditions in a laboratory scale cooling test rig. The samples differed in that one was prepared in a similar fashion as Example 1 of the present invention (designated Sample 1), and had a hypophosphorous acid efficiency of >90 mole percent. The other sample was prepared in a similar manner as Comparative Example 1 (designated Comparative Sample 1) and had a hypophosphorous acid efficiency of 80 mole percent.

The water matrix contained 600 ppm Ca, 300 ppm Mg, 50 ppm M-alkalinity (all as $CaCO_3$), 15 ppm orthophosphate, 3 ppm pyrophosphate, 1.2 ppm halogen substituted azole corrosion inhibitor, and poly[acrylic acid-co-ammonium allylpolyethoxy (10) sulfate]. Operating parameters included a bulk temperature of 120° F., a heat transfer rate of 8,000 BTU/($ft^2$*hr) across a mild steel heat transfer tube, a water velocity of 2.8 ft/sec, a retention time of 1.4 days (to 75% depletion) and a test duration of 7 days. Both mild steel and admiralty brass coupons were inserted into the test rig.

In this simulation, four parameters are monitored which are indicative of polymer performance. They are 1) the charged phosphate recovery levels, 2) the bulk turbidity values which develop in the cooling water, 3) the average delta phosphate values (the difference between filtered and unfiltered phosphate concentrations), and 4) the amount of deposition which observed on the heat transfer tube. Under this recirculating rig condition, Sample 1 not only maintained the charged phosphate concentration, bulk turbidity and low delta phosphate values but also kept the heat transfer surface free of deposition. However, Comparative Sample 1 did not maintain the charged phosphate levels as indicated by a 50% decrease in measurable orthophosphate. The performance of Comparative Sample 1 in this application was therefore unacceptable. The results of this testing is summarized in Table 2.

TABLE 2

| | Charge Dosage (ppm) | Recovery Dosage (ppm) | Turbidity (NTU) | Delta PO4 (ppm) | Tube Appearance |
|---|---|---|---|---|---|
| Sample 1 | 7.0 | 7.0 | 0.188 | 0.2 | Pass |
| Comparative Sample 1 | 7.0 | 3.6 | 0.288 | 0.0 | Pass |

While this invention has been described with respect to particular embodiments thereof, it is apparent that numerous other forms and modifications of this invention will be obvious to those skilled in the art. For example the hypophosphorous acid chain transfer agent could be substituted with phosphorous acid to maximize the yield of the monoalkyl phosphonate species. In addition, the acrylic acid component could be replaced wholly, or in part, with other water-soluble ethylenically substituted monomers capable of being copolymerized with allyloxy compounds. The appended claims and this invention generally should be construed to cover all such obvious forms and modifications that are within the true spirit and scope of the invention.

What is claimed is:

1. A process for utilizing hypophosphorous acid or its salts thereof as a chain transfer agent in the aqueous polymerization of acrylic acid with allyloxy monomers to form an acrylic acid copolymer, comprising:
   a) charging the allyloxy monomer initially to the polymerization reactor;
   b) metering into the polymerization reactor the hypophosphorous acid and acrylic acid feeds in a staggered fashion such that the hypophosphorous acid feed is from 0% to 75% the duration of the acrylic acid feed;
   c) simultaneously charging a water-soluble initiator to the polymerization reactor wherein the duration of the initiator feed is from 0% to 150% the duration of the acrylic acid feed, wherein at least 75 mole % of the hypophosphorous acid charged is incorporated into the resulting polymer matrix.

2. The process of claim 1 wherein the acrylic acid copolymer comprises a water-soluble or water-dispersible polymer of the formula

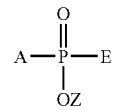

wherein A is a random polymeric residual comprising at least one unit of the formula

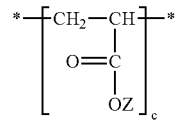

and at least one unit of the formula

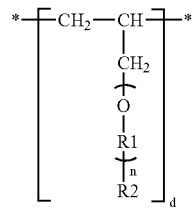

and E is hydrogen, OZ, a residue A, or mixtures thereof; wherein segment R1 is $—CH_2—CH_2—$, $—CH_2—CH(CH_3)—$, $—CH_2—CH(OH)—$, $—CH_2—CH(OH)—CH_2—$, or mixtures thereof; R2 is OH, $SO_3Z$, $OSO_3Z$, $PO_3Z_2$, $OPO_3Z_2$, $CO_2Z$, or mixtures thereof; n ranges from 1 to 100; Z is hydrogen or a water soluble cation selected from the group consisting of Na, K, Ca and $NH_4$; the molar ratio c:d ranges from 30:1 to 1:20.

3. The process of claim 1 wherein the allyloxy monomer is 1-allyloxy-2,3-propanediol; sodium 1-allyloxy-2-hydroxypropyl sulfonate; hydroxypolyethoxy allyl ether; ammonium allylpolyethoxy sulfate; or mixtures thereof.

4. The process of claim 2 wherein R1 is $—CH_2—CH_2—$, $—CH_2—CH(OH)—CH_2—$, or mixtures thereof; R2 is OH, $SO_3Z$, $OSO_3Z$ or mixtures thereof; n ranges from 1 to 20; Z is hydrogen or a water soluble cation selected from the group consisting of Na, K, and $NH_4$; the molar ratio c:d ranges from 15:1 to 1:10.

5. The process of claim 2 wherein R1 is $—CH_2—CH_2—$; R2 is $OSO_3Z$; n ranges from 5 to 20; Z is hydrogen or a water soluble cation selected from the group consisting of Na, K, and $NH_4$; the molar ratio c:d ranges from 15:1 to 2:1.

6. The process of claim 1 wherein at least 85 mole % of the hypophosphorous acid charged is incorporated into the resulting polymer matrix.

7. The process of claim 1 wherein said copolymers are added to an aqueous system in an effective amount for the purpose of controlling corrosion and the deposition of scale imparting participates on the structural parts in contact with the aqueous system.

8. The process of claim 7 wherein the allyloxy monomer is 1-allyloxy-2,3-propanediol; sodium 1-allyloxy-2-hydroxypropyl sulfonate; hydroxypolyethoxy allyl ether; ammonium allylpolyethoxy sulfate; or mixtures thereof.

9. The process of claim 7 further comprising adding to the aqueous system an effective amount for the purpose a topping agent selected from the group consisting of polyacrylates, phosphoric acid and water-soluble salts thereof, phosphonic acids and water-soluble salts thereof, azole compounds, and polyepoxysuccinic acids.

10. The process of claim 1 wherein said hypophosphorous acid or salt thereof is shot fed to the polymerization prior to feed of said acrylic acid to said reactor.

11. The process of claim 1 wherein said hypophosphorous acid feed is for about 50%–75% of the duration of said acrylic acid feed.

* * * * *